Sept. 19, 1961   J. H. HAMMOND, JR., ET AL   3,001,192
NAVIGATIONAL COURSE INDICATOR
Filed April 8, 1957   3 Sheets-Sheet 1

*INVENTORS*
JOHN HAYS HAMMOND JR.
EMORY LEON CHAFFEE
BY *[signature]* ATTORNEY

INVENTORS
JOHN HAYS HAMMOND JR.
EMORY LEON CHAFFEE
BY
ATTORNEY

Sept. 19, 1961   J. H. HAMMOND, JR., ET AL   3,001,192
NAVIGATIONAL COURSE INDICATOR
Filed April 8, 1957   3 Sheets-Sheet 3

INVENTORS
JOHN HAYS HAMMOND JR.
EMORY LEON CHAFFEE
BY
ATTORNEY

United States Patent Office 3,001,192
Patented Sept. 19, 1961

1

3,001,192
NAVIGATIONAL COURSE INDICATOR
John Hays Hammond, Jr., % Hammond Research Corp., Gloucester, Mass., and Emory Leon Chaffee, Belmont, Mass.; said Chaffee assignor to said Hammond
Filed Apr. 8, 1957, Ser. No. 651,459
4 Claims. (Cl. 343—11)

This invention relates to radar systems for determining range and bearing of an object with respect to the radar antenna located on a second object, and provides an auxiliary system for a plan-position indicator (P.P.I.) radar system which exhibits the course of any nearby object relative to the position of the antenna, and also provides a permanent record of the relative course of each object in the vicinity of the radar antenna.

The P.P.I. radar system installed on a ship or on any other moving or stationary object ordinarily gives the instantaneous range and bearing of each object in its vicinity. The course of any object relative to the radar system antenna may be obtained only by manually plotting the successive positions of the object on a plastic disk placed over the radar indicator screen.

The present invention provides means for automatically plotting the successive positions and bearings with respect to the radar antenna of each object in the vicinity of the antenna so that extended portions of the course of each object relative to the radar antenna can be readily observed. When the invention is installed on a ship the course of any nearby ship or buoy relative to the radar ship can be observed by the navigator.

This invention also provides a permanent record at all times of the distances to and bearings of all objects in the vicinity of the radar antenna so as to make available an exact and permanent record of the motion or courses, relative to the antenna of the radar system, of all objects in the vicinity of the antenna. For example, the record could show the relative courses with respect to a ship at sea of all other nearby ships, or the courses of aircraft near an airfield or of ships in and out of a harbor.

Another purpose of the invention is to provide a record of the speed and direction of motion at all times of the ship or other vehicle on which the invention is installed.

In accordance with the invention the radial sweeps of the conventional P.P.I. radar tube are repeated in a fixed non rotating position on the screen of an auxiliary cathode-ray tube. An image of this sweep pattern, with its intensified spots indicating ranges to nearby objects, is projected by a lens onto the receiving screen of a television camera tube such as a vidicon tube. The electrical image thus set up on the camera tube is swept at a low rate of say 60 sweeps per second. The resulting pulses from the camera tube corresponding to the various ranges are recorded on a moving magnetic tape or other suitable memory device which retains all received pulses until voluntarily erased by a magnet placed near the tape. Pulses taken off this rotating tape by a separate receiving head are amplified and applied to the modulating grid of a second cathode-ray indicator tube similar to the indicator tube of the conventional P.P.I. radar system. The electron beam of this second cathode-ray tube is deflected radially by a 60-cycle saw-tooth wave, and this radial deflection is caused to rotate in synchronism with the antenna and the radial deflection of the radar indicator tube. Thus the entire cours of an object relative to the ship carrying the system is recorded on the second P.P.I. tube until erased from the magnetic tape.

The pulses from the tape which actuate the second P.P.I. tube are also amplified and are then applied to two paper-tape recorders. The tape moves uniformly with respect to time in each recorder. On one recorder the ranges to nearby objects are recorded and plotted against

2 time. In the second recorder the bearings to the objects are recorded against time.

Instead of recording on paper tape the permanent record may be obtained by photographing at predetermined intervals the screen of the second cathode-ray indicator tube.

The invention also consists in certain new and original features of construction and combinations of parts hereinafter set forth and claimed.

The nature of the invention as to its objects and advantages, the mode of its operation and the manner of its organization, may be better understood by referring to the following description, taken in connection with the accompanying drawing forming a part thereof, in which FIG. 1 is a perspective view of the several units of the system and the electrical interconnection of the units.

Like reference characters denote like parts in the several figures of the drawings.

In the following description parts will be identified by specific names for convenience, but they are intended to be as generic in their application to similar parts as the art will permit.

Figure 1:
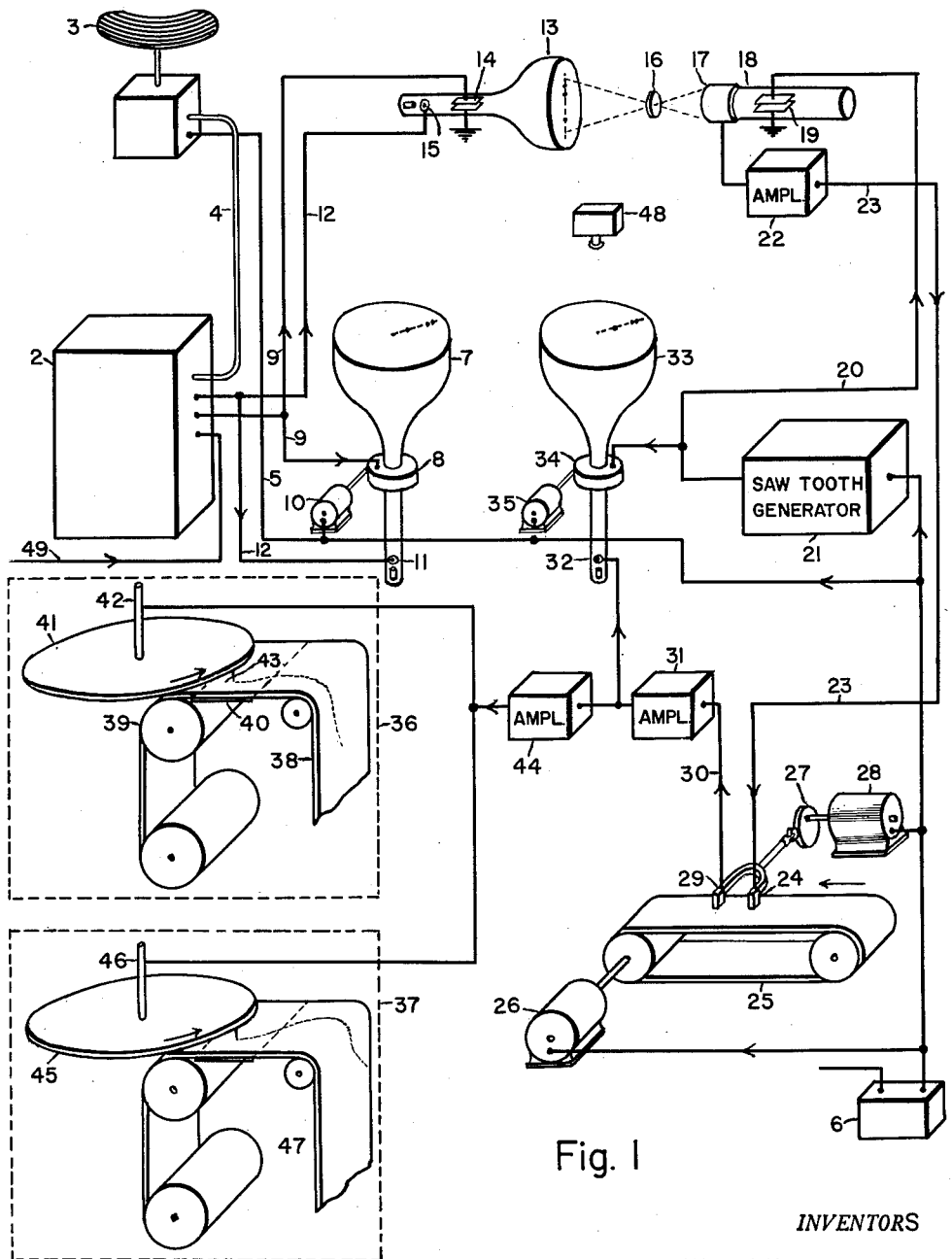

Referring to FIG. 1, the transmitter and receiver 2 of a conventional P.P.I. radar system are shown. The transmitter supplies the micro-wave pulses to a rotating radiator 3 through wave guide 4. The radiator 3 is rotated at a speed of 10 r.p.m., for example, by power fed over line 5 from a suitable alternating-current power supply 6. The electron beam of the conventional indicator cathode-ray tube 7 is deflected radially by the deflecting yoke 8 by reason of a saw-tooth wave having a frequency of from 800 to 2000 cycles per second supplied from the transmitter 2 over line 9. The yoke 8 is rotated in synchronism with antenna radiator 3 by motor 10 fed from line 5. The electron beam of tube 7 is modulated by the received echo pulses from the receiver in block 2 fed to the modulating grid 11 over line 12. The equipment described up to this point is conventional and may be of various forms and sizes while possessing the essential elements referred to by the members 2 through 12.

The electron beam of a cathode-ray tube 13 is deflected in a single direction, for example the vertical direction, by deflection means 14 actuated by the same saw-tooth wave that is fed over line 9 to the yoke 8 of indicator tube 7. The electron beam of tube 13 is also modulated by the same echo pulses as the electron beam of indicator tube 7. These modulating pulses are fed over line 12 to the modulating grid 15 of tube 13. Thus the images or spots on the screen of the tube 13 correspond in radial position to the radial position of the spots on the tube 7 which represents the ranges of the respective objects. The timing of the spots on the tube 13 corresponds to the timing of the spots on the tube 7 which in turn corresponds to the angular positions of the objects as determined during one rotation of the antenna; hence the bearing and range of each object is represented by the timing and the vertical displacement of the respective spot or image on the screen of the tube 13.

The images on the screen of tube 13 are projected by lens 16 onto the receiving screen 17 of television camera tube 18, such as a vidicon tube. The electron beam of camera tube 18 is caused to sweep vertically the image on its screen 17 by a low frequency saw-tooth wave having a frequency of, say, 60 cycles per second. The slight persistence of the phosphor of tube 13 together with the storage of the electrical image on the screen 17 of tube 18 makes it unnecessary to have any definite relation between the high frequency sweeps in tube 13 and the low frequency sweeps in tube 18. The 60 cycle sweeping of the screen 17 is selected so as to effect 360 sweeps of the screen 17 during each rotation of the antenna or one sweep for each degree of scanning of the antenna. The rate is of course given only as an example. The low frequency saw-tooth sweep wave is fed to deflecting means 19 in tube 18 over line 20 from the saw-tooth wave generator 21. This generator 21 is fed from a suitable power supply such as is represented by block 6.

The electrical pulses derived from the screen 17 of camera tube 18 by reason of the bright spots on the screen 17 resulting from the echo pulses received by the radar system, are increased in strength by amplifier 22, and fed over line 23 to the magnetic recording head 24. Recording head 24 records magnetically along a narrow strip, say 1/16 inch wide, of magnetic tape 25 according to the pulses from camera tube 18. The magnetic tape 25 may be, say, 2 inches wide, and may be driven by motor 26 at a speed of, say, 7.5 feet per second. The recording head 24 is caused to move laterally across tape 25 by cam 27, or other suitable mechanism, driven by motor 28 so that head 24 makes a complete excursion across the tape during one revolution of antenna radiator 3, and returns during the next revolution of radiator 3. If the tape is, say, 3 feet long, operating at the speed suggested, each sweep of the image on the screen of tube 18 occupies a strip on the tape about 1.5 inches long. The tape must be driven in an exact speed relation to the speed of rotation of antenna radiator 3, so that a complete track on the tape is traversed by the head 24 during each rotation of the radiator 3. Hence the tape carries a sequence of pulses representing the data obtained during each scan of the antenna, and the data obtained during successive scans is superimposed on the track so that the tape records and accumulates data representing the successive positions of the various spots on the cathode-ray tube as determined by the successive scans of the antenna.

A pick-up head 29, location rigidly with respect to recording head 24, follows the sound track on the tape 25, reproduces the pulses recorded by head 24, and feeds them through line 30 to amplifier 31. After intensification by the amplifier, the pulses are fed to the modulating grid 32 of a second indicator cathode-ray tube 33, similar to the first indicator tube 7. A radial-deflection yoke 34 of indicator tube 33 is driven by motor 35 in synchronism with the rotating yoke 8 of indicator tube 7, but advanced in phase by the time lag introduced by the distance between the two heads 24 and 29. Thus the display on the screen of the second indicator tube 33 is an integration of all the images on tube 7 as stored on tape 25, until erased in part or in entirety by a permanent magnet held momentarily against tape 25.

A permanent record of the distance and bearing of objects in the vicinity of the radar antenna and the time of observation may be printed on paper tape by two recorders of suitable form in blocks 36 and 37. One type recorder is illustrated in block 36 of FIG. 1 and also in FIG. 4. The identifying numbers are the same in FIG. 4 as for the recorder in block 36.

Figure 4:
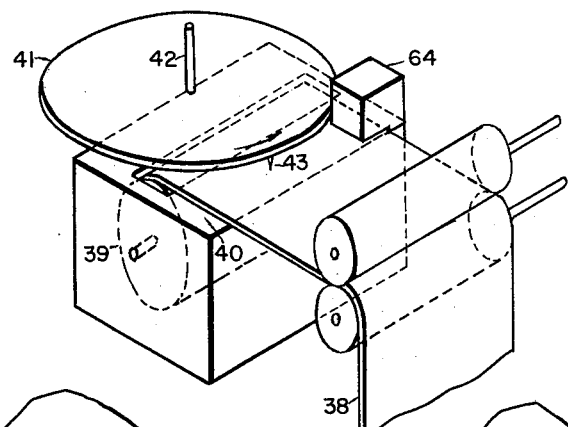
FIG. 4 is a perspective view of one of the recorders.

In FIG. 4 a paper tape 38 is fed over spool 39 and flat metallic table 40 at a speed of, say 1 inch in 10 minutes. A disk 41 rotates about vertical axis 42 and is electrically insulated from table 40. Six needle points, one of which is shown at 43, are attached to the periphery of disk 41 at the intervals of 60 degrees, and pass over paper tape 38 close to its surface and above table 40. For the recorder in block 36 a needle point sweeps across the paper tape during each sweep of the camera tube 18. The pulses from amplifier 31 are further intensified by amplifier 44 to produce sparks from needle 43 through the paper 38 to the table 40 thus recording by their timing the pulses on the paper tape in such a way that the radar range is represented by the displacements of the marking along the circular arc described by needle point 43. If the rotation of the antenna radiator 3 is 10 r.p.m. and there are 360 sweeps per rotation, then shaft 42 must rotate at a speed of 10 r.p.s. and be accurately adjusted in phase so that the initially emitted radar pulses occur when the needle is just within the border of the tape 38.

Bearings are recorded by a similar recorder in block 37 fed by the same spark pulses from amplifier 44. The only difference between recorders 36 and 37 is the speed of rotation of the recording disks 41 and 45. Disk 45 of recorder 37 rotates on shaft 46 at a speed of 10/6 or 1.666 r.p.m. so that a needle makes a traverse of the paper during each rotation of the antenna 3, and its phase is adjusted so that a needle is at the center of tape 47 when the antenna radiator points straight forward in the direction of motion of the vehicle on which the radar is installed. Hence the marking produced on the paper 47 by the needle in recorder 37 indicates by its displacement across the paper the angular position or bearing of the object.

The permanent record may be made photographically instead of by means of recorders 36 and 37 and amplifier 44. A camera 48 is caused automatically to photograph the screen of indicator tube 33 periodically at recorded times. The time of each record may be recorded by simultaneously photographing the face of a clock, not shown in FIG. 1.

Figure 2:
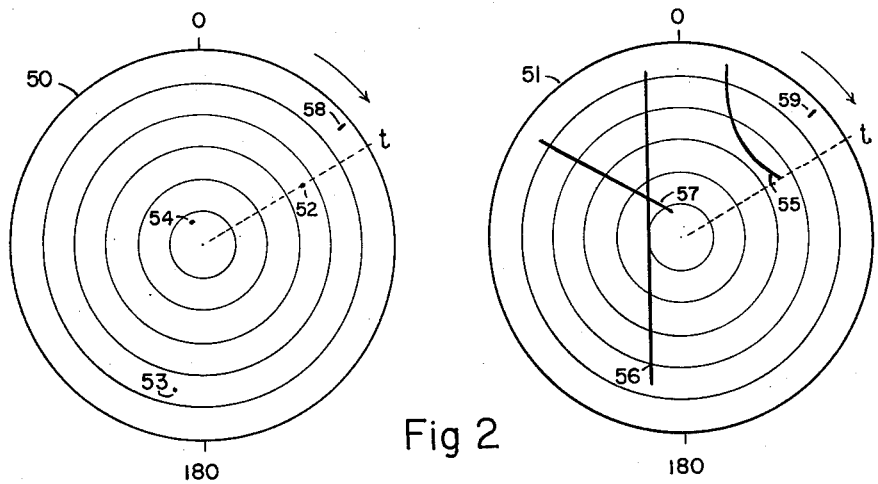
FIG. 2 shows the screen of the conventional P.P.I. tube and the screen of the second P.P.I. tube.

The mode of operation of the invention has been explained along with the description of its parts, but a further explanation is made by reference to FIGS. 2, 3, 4, and 5. Referring to FIG. 2, circle 50 represents the outer edge of the screen of indicator tube 7, while circle 51 represents the outer edge of the screen of the second indicator tube 33. Spots 52, 53, and 54 represent fluorescent spots indicating the instantaneous positions of three objects in the vicinity of the vehicle carrying the radar. Spot 53 is assumed for illustration to be a stationary buoy to the right of which the ship carrying the radar has passed. These spots are also correspondingly represented by the end points of traces 55, 56, and 57 on screen 51. But since the magnetic tape 25 retains the record of previous positions of the several objects, the entire courses of the objects with respect to the ship within a certain radius are traced on screen 51 every other time the radiator 3 rotates. A record each time the radiator 3 rotates could be obtained if a second pair of recording and pickup heads on tape 25 were arranged to travel across the tape while the heads 24 and 29 were returning.

The spots 58 and 59 indicate the true north direction and are produced by pulses from the receiver in block 2 initiated by signals from the ship's gyro compass over line 49 in FIG. 1 in the conventional manner.

The five range circles on screen 50 representing, for example, 1, 2, 3, 4, and 5 miles in range, are produced by suitably timed pulses from the receiver in block 2 in the conventional manner. These range circles are copied by the auxiliary equipment and appear on screen 51 of tube 33. The range circles may be changed in the usual manner by a switch on the transmitter-receiver unit 2.

Figure 3:
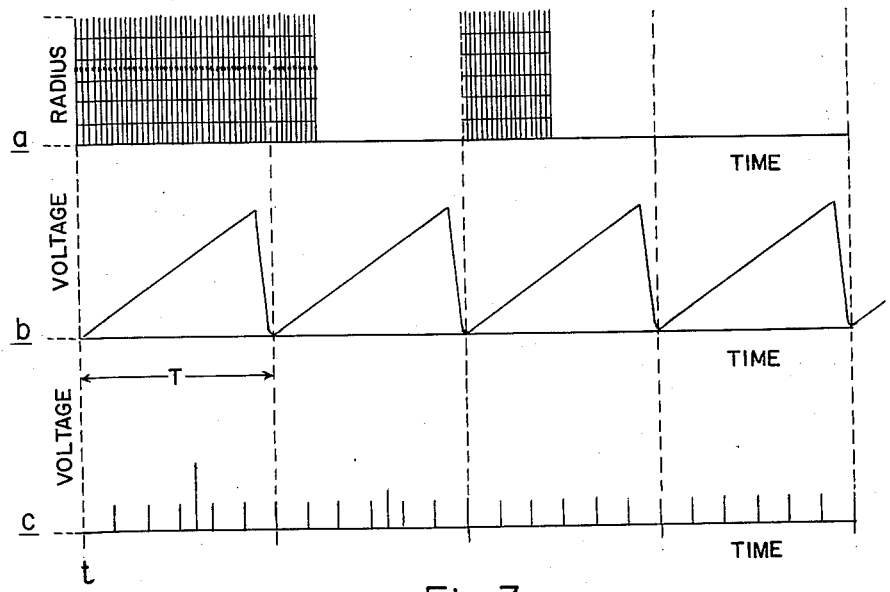
FIG. 3 shows some of the wave forms which are produced during the operation of the system.

Referring to FIG. 3, line $a$ represents the successive high frequency radial sweeps of indicator tube 7, intensified slightly by the pulses for the five range circles, and intensified strongly for an object shown for illustration as located about 3.6 miles from the ship. These latter pulses correspond to the fluorescent spot 52 in FIG. 2. Line $b$ indicates the low frequency saw-tooth voltage wave produced by saw-tooth generator 21 and used for sweeping of tubes 18 and 33. The period T of the saw-tooth wave is assumed, for illustration, to be $\frac{1}{60}$ second. Line $c$ represents the voltage pulses produced by the camera tube 18, showing the pulses for the range circles and for an object 3.6 miles distant, as indicated in line *a*.

Figure 5:
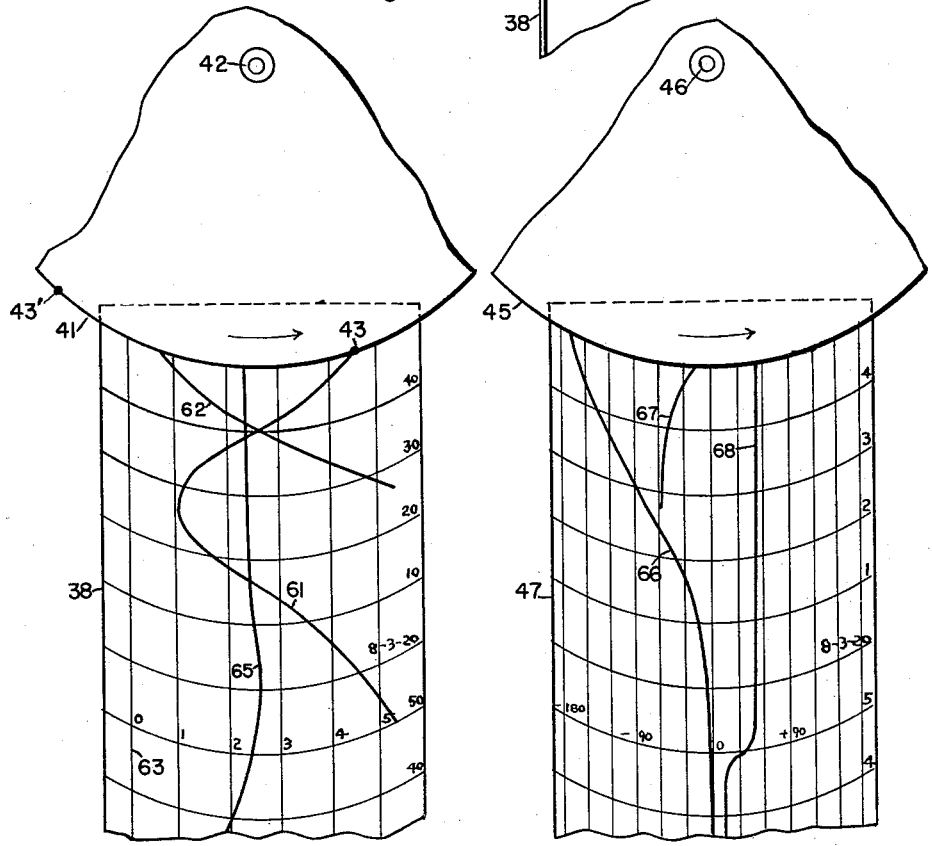
FIG. 5 shows the type of records from the two recorders.

Referring to FIG. 5, rotating disk 41 of recorder 36 and rotating disk 45 of recorder 37 are indicated in FIG. 5 by the segments of circles thus designated. Needle 43 is shown in the recording position while needle 43' is about to record. The type of record corresponding to the course of the buoy giving trace 56 and of the object producing trace 57 in FIG. 2, are illustrated by traces 61 and 62, respectively, in FIG. 5. The five range circles and the zero range are represented by the six longitudinal traces produced by the recorder, the line 63 at the left representing zero range. The ship's time is automatically recorded on the edge of the strip every ten minutes by time marker 64 in FIG. 4. The instantaneous time of a recording point 43 is indicated for example by the numbers 8—3—20—50 representing 8th month, 3d day, 20th hour, and 50th minute. The speed of the ship can be recorded on tape 38, as shown by trace 65, by means of a pen recorder, not shown, which is deflected from the zero range line 63 a distance proportional to the speed of the ship. The ship's log furnishes the indicating voltage.

Tape 47 of FIG. 5 represents the record tape of recorder 37. A needle on the periphery of disk 45 makes one excursion across tape 47 during one rotation of antenna radiator 3 and arrives at the mid point of the tape 47 when radiator 3 points in the direction of motion of the ship or vehicle carrying the radar system. The longitudinal lines are printed on tape 47, and correspond to angular bearings with respect to the direction of motion of the vehicle. The bearings at various times for traces 61 and 62 on tape 38 are represented by traces 66 and 67, respectively. These are recorded by the pulses from amplifier 44. The true north direction indicated by spots 58 and 59 in FIG. 2 is also recorded on tape 47 as shown by trace 68.

Although only a few of the various forms in which this invention may be embodied have been shown herein, it is to be understood that the invention is not limited to any specific construction but may be embodied in various forms without departing from the spirit of the invention.

What is claimed is:

1. A system for indicating the course of an object relative to an observation point, comprising a radar transmitter and rotating radiator which emits a beam of radio waves having timed pulses, said beam being swept over the surrounding area by said radiator in repeated radar scans, and having receiver means to receive echo radar pulses having time characteristics representing respectively the bearing and range of said object at successive radar scans, a cathode ray tube having a screen traversed by an electron beam, means causing said beam to sweep across said screen linearly in synchronism with said timed pulses, means responsive to said echo pulse to produce on said screen a spot having a timing and linear displacement representing respectively the bearing and range of said object at each radar scan, means sweeping said screen linearly at a predetermined sweeping rate lower than the rate of said timed pulses, to produce a series of electric pulses, a magnetic recorder having a track repeatedly traversed by a recording head at a rate to effect a complete traverse during a single scan of said radiator, means responsive to said last sweeping means to actuate said head to record a series of pulses in positions along said track representing the timing of said electric pulses, a reproducing head responsive to said recorded magnetic pulses, a second cathode-ray tube having a screen traversed by an electron beam, means causing radial displacement of said beam at said predetermined sweep rate, means rotating the radial displacement of said beam in synchronism with the rotation of said radiator and means responsive to said reproducing head to produce a series of spots on said last screen having positions representing the bearing and range of said object at successive radar scans.

2. In a system as set forth in claim 1, a record strip, means advancing said strip at a uniform rate, recording means movable across said strip at said predetermined sweep rate, and means responsive to said reproducing head to actuate said recording means to make an indication on said strip the displacement of which represents the range of said object.

3. The system set forth in claim 2 in which said recording means comprises a rotating disc having projecting points traversing said strip and said actuating means is adapted to produce an electric discharge from said points which makes an imprint on said strip.

4. In a system as set forth in claim 1, a record strip, means advancing said strip at a uniform rate, recording means movable across said strip in synchronism with the rotation of said rotating radiator, and means responsive to said reproducing head to actuate said recording means to make an indication on said strip the displacement of which represents the bearing of said object.

References Cited in the file of this patent

UNITED STATES PATENTS

| | | |
|---|---|---|
| 2,410,424 | Brown | Nov. 5, 1946 |
| 2,412,669 | Bedford | Dec. 17, 1946 |
| 2,430,283 | Epstein | Nov. 4, 1947 |
| 2,524,295 | Mesner | Oct. 3, 1950 |
| 2,702,356 | Flory | Feb. 15, 1955 |
| 2,779,017 | Land et al. | Jan. 22, 1957 |